US008106114B2

(12) United States Patent
Eaton et al.

(10) Patent No.: US 8,106,114 B2
(45) Date of Patent: Jan. 31, 2012

(54) DRAG REDUCING AGENT AND METHOD OF USE

(75) Inventors: Gerald Bruce Eaton, Houston, TX (US); Alan Kim Ebert, Houston, TX (US)

(73) Assignee: Beta Technologie AG, Bern (CH)

( * ) Notice: Subject to any disclaimer, the term of this patent is extended or adjusted under 35 U.S.C. 154(b) by 91 days.

(21) Appl. No.: 12/589,818

(22) Filed: Oct. 29, 2009

(65) Prior Publication Data

US 2011/0105642 A1 May 5, 2011

(51) Int. Cl.
*C09K 3/00* (2006.01)

(52) U.S. Cl. .......................................................... 523/175

(58) Field of Classification Search ................... 523/175
See application file for complete search history.

(56) References Cited

U.S. PATENT DOCUMENTS

| | | | |
|---|---|---|---|
| 3,657,351 | A | 4/1972 | Araki et al. |
| 2002/0173569 | A1 | 11/2002 | Karhu et al. |
| 2003/0065055 | A1 | 4/2003 | Johnston et al. |
| 2007/0021531 | A1 | 1/2007 | Motier et al. |

OTHER PUBLICATIONS

International Search Report for Patent Application No. PCT/US2010/002867, dated Jan. 12, 2011 (11 pages).

*Primary Examiner* — Edward Cain
(74) *Attorney, Agent, or Firm* — The Matthews Firm

(57) ABSTRACT

The present invention relates to a drag reducing agent, composition, compound, product, process and method of use for use in petroleum pipelines and the like. A preferred embodiment of the present invention provides a cryogenically-ground polyalphaolefin polymer at 15-25 wt. % of the commercial product formulation. The bulking agents comprise ethylene bis-stearamide alone or in combination with other polyethylene and/or polypropylene polymers at 2.0-5.0 wt. % of the commercial product formulation. In addition, diisobutyl ketone 20-60 wt. % of the commercial product formulation and propylene carbonate 2.8-8.4 wt. % of the commercial product formulation are used.

20 Claims, No Drawings

DRAG REDUCING AGENT AND METHOD OF USE

FIELD OF THE INVENTION

The present invention relates generally to a drag reducing agent, composition, compound, product, process and method of use. Specifically, the present invention relates to a drag reducing agent, composition, compound, product, process and method of use for use in petroleum pipelines and the like.

BACKGROUND OF THE INVENTION

Petroleum pipeline drag reducing agents (hereafter referred to as DRA) were first commercially introduced to the world's petroleum pipeline industry in the late 1970's. The first commercially viable DRA products were produced by adding lower alpha olefin monomers having carbon ranges from C-4 to C-14 with various solvents or distillates such as heavy aromatic distillates (HAD), Mollenex raffinate, and other kerosine distillate cuts and polymerizing these olefin monomers within this mixture. A conventional Ziegler-Natta catalyst system was used to promote this polymerization process. These first commercially viable DRA products were a result of polymerizing these monomers.

The monomers were polymerized into a very high molecular amorphous polymer within a reactor purged with nitrogen gas about 99.99% pure, and being otherwise absent of moisture, and free of water and oxygen. The resulting polymerized alpha-olefin polymer constituted nominally 5-10 weight percent of the total mass of the DRA product with the solvent contributing the remainder of the mass of this type of DRA product. The physical properties of this polymerized mixture of olefin and the solvent was very viscous and soon took on the name of a DRA "GEL" product because of its apparent physical property. This DRA product was first commercially used in the Trans-Alaskan Pipeline System ("TAPS") in the late 1970's and coincided with the ability to successfully start-up this new pipeline system. The DRA product provided immediate benefits for the TAPS. The DRA product allowed the passage of significantly larger volumes of North Slope crude oil than had been envisioned by the design standards of TAPS. The use of this DRA product allowed TAPS to overcome the impact of an unanticipated and unfortunate start-up event and further allowed TAPS to move a higher volume of crude oil without the addition and associated expense of more intermediate pumping stations originally anticipated as a requirement within the original design of this pipeline system prior to the implementation of the DRA GEL Products. From the beginning, TAPS has continuously applied DRA. Even in the evolving commercial forms of DRA, TAPS has applied DRA to its pipeline system from it's commissioning until today to move crude oil from the North Slope production area to the export terminal near Valdez, Ak. This historical use by TAPS first defined the practical and technical advantages of DRA products and was the beginning of recognizing DRA products and DRA technology as a new and "strategic component" to facilitate the ability to transport more petroleum liquids including crude oil, refined products, and natural gas liquids in existing and new pipelines used around the world.

The first DRA GEL products, as noted above, were both effective and were responsible for escorting this technology and the ultimate acceptance of the DRA product within the petroleum pipelines systems throughout the worldwide. These GEL-type DRA, however, were not a complete solution to the end-users needs. Their physical properties, price, logistical requirements and limited polymer concentration restricted their acceptance and usage within many candidate pipelines around the world. The GEL-type DRA gelatinous nature made them unhandy and troublesome in meeting application and housekeeping requirements. The operators directly involved with the application of these GEL-type DRAs had many reasons not to like the products. The operators had problems with the form and nature of the GEL-type DRAs associated with "hook-up" and the packing leakage from packing glands on DRA pumps used to inject this DRA into the high pressure petroleum was a never-ending and unpleasant chore. The physical properties of the GEL-type DRAs created daily housekeeping challenges that involved the need for the operator to physically remove this leakage from the area and dispose of the material. Proper disposal posed a secondary but significant problem.

The GEL DRA had additional usage drawbacks. The GEL DRA had inherently poor kinetic solubility characteristics and slow dissolution rates which required them to be injected through a specially configured quill assembly to help increase their dissolution rate into the petroleum pipeline stock. The use of these GEL DRA also required the use of a high-pressure gas nitrogen cylinder for low pressure regulation of nitrogen gas to supply each GEL DRA usage location the means to pressurize the DRA shipping and storage containers. The use of the high-pressure nitrogen gas promoted the movement of this thick GEL DRA product from the storage tanks to the DRA injection pump suction lines. The nitrogen pressurization requirement of the thick GEL DRA product within these shipping and storage containers was both expensive and created continuous maintenance and logistic and supply problems for the pipeline operations and other personnel. For example, the nitrogen pressurization requirement of the thick GEL DRA product required that the nitrogen gas cylinders be transported to remote locations of use such as the pump stations along the TAPS pipeline system. Other downsides included freight, logistics and inventory costs associated with these low polymer solids, GEL-based DRA solution polymers.

During the 1980's and early 1990's, these GEL DRA products found broad acceptance for use in onshore and offshore crude oil pipeline applications and were also accepted for use in refined products pipeline within the United States. The rapid expansion and use of GEL DRA in overseas locations exposed their "practical downside." The downside related directly to their handling concerns and the logistics, transportation and container cost required with supplying large volumes of low-polymer solids GEL DRA products. Several of the offshore locations could require from several hundred to several thousand gallons of the GEL DRA products on a daily basis. Since these GEL DRA products were produced exclusively within the United States, and by only two manufacturers, and supplied to the worldwide user base from these two U.S. manufacturing locations, the need to increase the polymer solids loading per unit volume became a more serious interest and challenge.

In the mid-1990's, a new DRA product was developed which raised the polymer solids loading by a factor approaching 3-times—from nominally about 8-9% by weight to approaching 25% by weight within the same unit volume. This new high polymer solids DRA product was first produced commercially as a cryogenically-ground slurry. This slurry DRA product immediately gained worldwide user acceptance based on its superior performance advantages and logistical benefits. These slurry-based DRA products now dominate the worldwide DRA "user" markets.

However, the present DRA products have failed to completely overcome the problem of separation between suspending agents and DRA polymer solids. Further, the present water-based slurry DRA products must be specifically reformulated to meet the climatic requirements for application in arctic conditions.

The present DRA products have a limited number of usable. DRA suspending liquids. Further, many of the DRA suspending agents require special additives, such as by way of example, clays, surfactants, biocides, anti-freeze, etc.

Since the first use of DRAs and even to this day, DRA slurries must be routinely stirred or circulated to keep the finely divided polymer solids in suspension. Thus, transportation and storage remains a concern and problem with the present DRA products. Most of the present DRA slurry products often require storage and transportation within tankage equipped with exterior insulation and heat transfer exchanger equipment. The present DRA products require storage and transportation equipment that must be heated. Also, the present DRA products require specially insulated, on-site injection equipment that must be heated or cooled and mechanically more robust to operate in arctic conditions. Also, the transportation equipment must have heavy, expensive mixing and circulating devices. The heavy, expensive mixing and circulating devices require more initial capital investment and result in extra energy and fuel cost for transporting this additional mixing equipment. Further, workers must use hazardous procedures to climb on the storage and transportation equipment to use high pressure lancing and mixing equipment to attempt to remix the suspension liquid and solid polymer to re-constitute the DRA slurry. This raises safety and economic issues.

In some formulations, the present DRA slurry products have noxious odors created by the use of the non-solvents, glycol ethers and alcohols. And, the present DRA products have a higher cost when compared to using the lower temperature freeze point vegoils.

The DRA slurry-based products' "scope-of-use" have been expanded within the United States and Europe to include refined products and refined products pipelines for the increase in flow rates and the lowering of the Maximum Allowable Operating Pressures (MAOP), both, and to lower energy consumption and costs at the pump stations by allowing some of the pump stations to be shut down and bypassed as a direct result of the DRA use. Slurry-based DRA product has also been expanded to lower energy consumption at the pump stations by allowing some of the pump stations to be shut down and bypassed, and included as design and engineering elements and considerations in the construction of new pipelines and operational options on existing projects and systems throughout the world.

A significant set of requirements is included within the production and sale of slurry-based DRA products to end-user markets within crude oil and refined products pipeline systems. The preferred DRA slurry product must generally include but is not specifically limited to the following general requirements:

1. must be relatively stable and capable of being transported over long distances whether the long trip is a domestic transfer or an international transfer, both without the need of special "in-shipment" agitation or mixing;

2. must possess reasonable "in-storage" stability, including the capability to be stored in bulk volume at the customer use location or other off location storage locations for extended periods of time and within reasonable ambient temperature ranges such that it maintains its product consistency alone or with the assistance of intermediate agitation and/or other physical systems which protect or buffer the slurry product temperature in order to maintain its stability and ability to be reconstituted into its fully functional product form should it be allowed to separate;

3. must not demonstrate the tendency to separate and/or agglomerate into an unrecoverable mass rendering it unusable;

4. must be composed of finely divided polyalphaolefin particles having minimum and maximum particle size distribution which allows for the injection and immediate dispersion of the DRA slurry product polymer within the treated petroleum stream upon entry into the pipeline system;

5. the preferred DRA slurry product used in refined fuels applications (excluding jet fuels) should be composed of solvent and non-solvents and other finely divided polyalphaolefin ("PAO") particles and particulate or dispersed components which do not negatively impact or harm these refined products and quality of the fuel or the safety and "end use" performance of the fuel at acceptable DRA dosages up to and including a maximum acceptable PAO dosage limit of about 15 ppm (wt/wt.) added to these refined products pipeline system.

It is a focus of the present invention to provide a new family of DRA suspending agents, which are commonly available components that are produced from strategically available alternative production units than the current limited sources of special alcohols, and complex water-alcohol and anti-freeze/additive suspending liquids.

The present invention also provides stability from separation between the new suspending agents and DRA polymer solids.

It is another focus of the present invention to provide various specifications and potential embodiments which are more specifically focused on the DRA slurry products and gel forms which would be primarily intended for use in refined products but should not be specifically limited to only such applications. It can be appreciated by those skilled in the art that the DRA slurry products and DRA gel products of the present invention has applications in every field of use applicable to DRA products.

It is, therefore, a feature of the present invention to provide DRA slurry products and DRA gel products.

A feature of the present invention is to provide DRA slurry products and DRA gel products that do not separate into an unrecoverable mass rendering it unusable.

A feature of the present invention is to provide DRA slurry products and DRA gel products that do not agglomerate into an unrecoverable mass rendering it unusable.

Another feature of the present invention is to provide DRA slurry products and DRA gel products that possess reasonable "in-storage" stability.

Yet another feature of the present invention is to provide DRA slurry products and DRA gel products that can be stored in bulk volume at the customer use location or other off location storage for extended periods of time and within reasonable ambient temperature ranges.

Still another feature of the present invention is to provide DRA slurry products and DRA gel products that maintains its product consistency during storage.

Yet still another feature of the present invention is to provide DRA slurry products and DRA gel products that maintain their stability and ability to be reconstituted into its fully functional product form should it be allowed to separate.

Another feature of the present invention is to provide DRA slurry products and DRA gel products that are sufficiently stable and capable of being transported over long distances without the need of special "in-shipment" agitation or mixing.

Still another feature of the present invention is to provide DRA slurry products and DRA gel products that is composed of finely divided polyalphaolefin particles having a minimum and maximum particle size distribution which allows for the injection and immediate dispersion of the DRA slurry product within the treated petroleum stream upon entry into the pipeline system.

Yet still another feature of the present invention is to provide DRA slurry products and DRA gel products that can be used in refined fuels applications that does not negatively impact or harm the refined products or the quality of the refined fuel or the safety and "end use" performance of the refined fuel.

Yet another feature of the present invention is to provide DRA slurry products and DRA gel products that can be used in refined fuels applications at acceptable DRA dosages up to and including a maximum acceptable PAO dosage limit of about 15 ppm (wt/wt.) added to the refined fuel products in a pipeline system.

Yet still another feature of the present invention is to provide DRA slurry products and DRA gel products that reduce the amounts of superfluous components that increase costs and do not contribute to the practical function of the DRA products.

Still another feature of the present invention is to provide DRA slurry products and DRA gel products that reduce the amounts of superfluous components that pose a greater risk of insult to the refined fuel properties, thus inhibiting the ability to raise the acceptable limits of use from the current 15 PPM polymer limits imposed by the refined products pipeline operators and their shippers.

Yet another feature of the present invention is to provide DRA slurry products and DRA gel products that overcome the severe problem of separation between suspending mediums and DRA polymer solids.

Yet still another feature of the present invention is to provide DRA slurry products and DRA gel products that have the characteristics required to be used in arctic conditions.

Still another feature of the present invention is to provide DRA slurry products and DRA gel products that, in some formulations, avoid having noxious odors created by the use of alcohols.

Yet still another feature of the present invention is to provide DRA slurry products and DRA gel products that have a lower cost than the present DRA products that use the higher temperature freeze point vegoils.

Yet still another feature of the present invention is to provide DRA slurry products and DRA gel products that increase the polymer solids loading of the product.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, DRA slurry products and DRA gel products are provided.

In one embodiment, a composition for a DRA slurry product is provided. In another embodiment, a composition for a DRA gel product is provided. In yet another embodiment, a compound for a DRA slurry product is provided. In still another embodiment, a compound for a DRA gel product is provided. In another embodiment, a DRA slurry product produced by a specific process is provided. In another embodiment, a DRA gel product produced by a specific process is provided. In yet another embodiment, a process for creating a DRA slurry product is provided. In still another embodiment, a process for creating a DRA gel product is provided. In yet another embodiment, a method of using a DRA slurry product is provided. In still another embodiment, a method of using a DRA gel product is provided.

The various embodiments of the present invention provide unexpected results and associated benefits. The various embodiments of this invention result in synergies and innovation involving technical and commercial latitudes offered by combining two or more dissimilar solvents, which by themselves are known to be completely unacceptable suspending agents for a finely divided DRA polymer particles and partitioning agents. But, as discovered in the present invention, when combined in certain and definite mixtures, one to the other, creates a new solvent mixture system which, surprisingly, is acceptable as a suspending medium for these particulates within the slurry. Additionally, it has been found that the present invention also provides additional benefits including being more acceptable and less objectionable as formulation components and relating to their more positive impact in and less insult to refined products and fuels transported within pipeline systems. Additionally, the present invention provides the ability to increase the DRA polymer solids loading in the slurry DRA products to a level allowing their transition from a reasonably stable free-flowing liquid slurry to a very stable flowable gel DRA product containing substantially higher amounts of DRA polymer solids when compared to other slurry based DRA products.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention.

In the slurry embodiment, a viable and commercial DRA slurry-based product can be produced by adding finely divided particles of polyalphaolefins produced from a single monomer or a mixture of these monomers having a range of from 1-butene through 1-tetradodocene combining these solvents and various bulking and partitioning agents.

The polymer provided by the present invention can be finely divided by several mechanical means including, but not limed to, grinding at cryogenic temperatures below −90° F. in a hammer or attrition mill, wet grinding at near ambient temperatures, and/or cryogenic size reduction below −90° F. within a ball mill.

The finely divided PAO polymers can be separated by the addition of various additives. The additives are added directly and/or proportionally with this AOM prior to being size reduced by the mechanical processes or apparatus previously discussed, or alternately the additives are added following this sizing reduction process. Suitable additives to serve in this bulk separation or particle partitioning process include petroleum or naturally occurring waxes such as bees wax, polyethylene waxes, polypropylene waxes, methylene waxes, various and other commercially available stearamide compounds including ethylene bis-stearamide and the like, charcoals and petroleum cokes, inorganic metal carbonates and sulfates, and various metal montmorillinites. The mass ratio of these additives can range between as low as 2% to as high as 45% mass of the PAO weight.

The solvents effective in this formulation and acting as suspending and thickening agents include heavy aromatic distillate and blends thereof, a full range of refined distillates, water, propylene carbonates, ethylene carbonate, glycerine carbonates, butylene carbonate, diethylene glycol butyl ethers, dipropylene glycol methyl ether, ethylene and propylene glycols, saturated and unsaturated linear and cyclic ketones including Eastman Chemical "C-11" ketone and DOW EcoSoft Solvent 1K (isobutyl heptyl ketone ketone-2, 6,8 trimethyl-nonan-4-one), dialkyl acetete-DAA, unrefined and refined vegetable oils including soy, corn, cottenseed, and rapeseed oils.

The solvents can be combined within this formulation at a mass concentration of 35% -90% by weight of the total mass of the DRA Product.

In the gel embodiment, a high solids DRA gel can be produced containing up to 30 mass weight % of PAO DRA polymer by adding these finely divided PAO DRA particles to a selected group of solvents and non-solvent mixtures within the solvents noted above and the partitioning agents indicated above.

These new DRA products possess similar physical characteristics of the gel-based DRA product while containing the higher PAO solids concentration of the slurry-based DRA product.

The benefits of this new DRA product would include reducing the amounts of superfluous components that increase costs and do not contribute to the practical function of the DRA product and posing a greater potential risk of insult to the refined fuel properties, thus inhibiting the ability to raise the acceptable limits of use from the current 15 PPM polymer limits imposed by the refined products pipeline operators and their shippers.

It is a significant discovery in the present invention to combine up to three liquids, which used as individual liquids to suspend DRA make the DRA non-functional. However, as discovered in the present invention, combining these liquids in the specified ratio of produces, a liquid which when used in association with the formation of DRA slurry has characteristics that do not render the DRA polymer non-functional, but rather unexpectedly enhances the functional characteristics of the DRA slurry.

Further, the ratio of these liquids can be manipulated to achieve an average density that approximates the density of the DRA polymer solids. Therefore, the solids are more stable in suspension and do not separate as quickly as if the liquid density and the solids density were not similar.

Still further, the liquids in this preferred embodiment have a low freeze point and can easily be transported and used in most arctic conditions.

A preferred embodiment of the present invention provides a cryogenically-ground polyalphaolefin polymer at 15-25 wt. % of the commercial product formulation. The bulking agents comprise ethylene bis-stearamide alone or in combination with other polyethylene and/or polypropylene polymers at 2.0-5.0 wt. % of the commercial product formulation. In addition, diisobutyl ketone 20-60 wt. % of the commercial product formulation and propylene carbonate 2.8-8.4 wt. % of the commercial product formulation are used.

Alternate preferred embodiments comprise the following.

A cryogenically ground polyalphaolefin polymer at 10-25 wt % of product. The bulking agents comprise ethylene bis-stearamide, polyethylene and polypropylene polymers at 1.0-4.0 wt. % of the commercial product formulation. Unsaturated linear and cyclic ketones including Eastman Chemical "C-11" [2,6,8 trimethyl-nonan-4-one] at 20-60 wt. % of the commercial product formulation is used, as well as propylene carbonate 1.0-9.0 wt. % of the commercial product formulation.

Also, a cryogenically-ground polyalphaolefin polymer at 10-25 wt % of product is used. The bulking agents comprise ethylene bis-stearamide, polyethylene and polypropylene polymers at 1.0-4.0 wt. % of the commercial product formulation. In association with unsaturated linear and cyclic ketones including Eastman Chemical "C-11" [2,6,8 trimethyl-nonan-4-one] at 20-60 wt. % of the commercial product formulation. Propylene carbonate at 1.0-9.0 wt. % of the commercial product formulation is used as well as heavy aromatic distillate or other refined distillates at 1-10 wt. % of the commercial product formulation.

In another embodiment, a cryogenically ground polyalphaolefin polymer at 10-25 wt % of product is used. The bulking agents comprise ethylene bis-stearamide, polyethylene and polypropylene polymers at 1.0-4.0 wt. % of the commercial product formulation. Unsaturated linear and cyclic ketones including Eastman Chemical "C-11" [2,6,8 trimethyl-nonan-4-one] at 20-60 wt. % of the commercial product formulation is provided. Propylene carbonate at 1.0-9.0 wt. % of the commercial product formulation as well as refined or unrefined vegetable oils including soy, linseed, cottonseed, rapeseed, and corn oils at 1-20 wt. % of the commercial product formulation.

In a gel formulation, a cryogenically ground polyalphaolefin polymer at 20-30 wt % of product is provided. The bulking agents comprise ethylene bis-stearamide, polyethylene and polypropylene polymers at 1.0-4.0 wt. % of the commercial product formulation. Also, unsaturated linear and cyclic ketones including Eastman Chemical "C-11" [2,6,8 trimethyl-nonan-4-one] at 20-60 wt. % of the commercial product formulation is used. Propylene carbonate at 1.0-9.0 wt. % of the commercial product formulation as well as refined or unrefined vegetable oils including soy, linseed, cottonseed, rapeseed, and corn oils at 1-20 wt. % of the commercial product formulation.

A cryogenically ground polyalphaolefin polymer at 10-25 wt. % of product is provided. The bulking agents comprise ethylene bis-stearamide, polyethylene and polypropylene polymers at 1.0-4.0 wt. % of the commercial Product formulation. Unsaturated linear and cyclic ketones including DOW Chemical "EcoSoft Solvent 1K" at 20-60 wt. % of the commercial product formulation is used. Also, propylene carbonate 1.0-9.0 wt. % of the commercial product formulation is used.

A cryogenically ground polyalphaolefin polymer at 10-25 wt. % of product is provided. The bulking agents comprise ethylene bis-stearamide, polyethylene and polypropylene polymers at 1.0-4.0 wt. % of the commercial Product formulation. Unsaturated linear and cyclic ketones including Dow Chemical "EcoSoft Solvent 1K" at 20-60 wt. % of the commercial product formulation is used. Also, propylene carbonate 1.0-9.0 wt. % of the commercial Product formulation as well as heavy aromatic distillate or other refined distillates at 1-10 wt. % of the commercial product formulation is used.

A cryogenically ground polyalphaolefin polymer at 10-25 wt. % of product is provided. The bulking agents comprise ethylene bis-stearamide, polyethylene and polypropylene polymers at 1.0-4.0 wt. % of the commercial product formulation. Unsaturated linear and cyclic ketones including Dow Chemical "EcoSoft Solvent 1K" at 20-60 wt. % of the commercial product formulation is used. Propylene carbonate 1.0-9.0 wt. % of the commercial Product formulation as well as refined or unrefined vegetable oils including soy, linseed, cottonseed, rapeseed, and corn oils at 1-20 wt. % of the commercial product formulation is included.

In a gel formulation, a cryogenically ground polyalphaolefin polymer at 20-30 wt. % of product is provided. The bulking agents comprise ethylene bis-stearamide, polyethylene and polypropylene polymers at 1.0-4.0 wt. % of the commercial Product formulation. Unsaturated linear and cyclic ketones including Dow Chemical "EcoSoft Solvent 1K" at 20-60 wt. % of the commercial product formulation is used. Propylene carbonate 1.0-9.0 wt. % of the commercial Product formulation as well as refined or unrefined vegetable oils including soy, linseed, cottonseed, rapeseed, and corn oils at 1-20 wt. % of the commercial product formulation is used.

The polymer solids within the DRA slurry product of the present invention exhibit swelling characteristics apparently related to the ratio of these solvent mixtures and/or the temperature. Also, higher temperatures appear to reduce the time required to observe and promote the phenomena and more swelling appears to occur. An increase of the polymer solids concentration is possible by adjusting these solvents' ratios, one to the other(s). These relative ratios are considered an important part of this invention.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

Appendix A is a 35 page Huntsman Brochure that is incorporated herein for all purposes.

Appendix B is a 2 page Dow Product Information Sheet for DIBK that is incorporated herein for all purposes.

Appendix C is a 2 page Dow Product Information Sheet for DIBK that is incorporated herein for all purposes.

Appendix D is a 1 page Eastman Product Comparisons Sheet for Solvents that is incorporated herein for all purposes.

Appendix E is an 8 page Dow Oxygenated Solvents Brochure that is incorporated herein for all purposes.

What is claimed is:

1. A cryogenically-ground polyalphaolefin polymer at 15-30 wt. % of the commercial product formulation comprising diisobutyl ketone, propylene carbonate and bulking agent.

2. The cryogenically-ground polyalphaolefin polymer of claim 1, wherein the diisobutyl ketone comprises 20-60 wt. % of the commercial product formulation.

3. The cryogenically-ground polyalphaolefin polymer of claim 1, wherein the propylene carbonate comprises 2.8-15.0 wt. % of the commercial product formulation.

4. The cryogenically-ground polyalphaolefin polymer of claim 1, wherein the bulking agent comprising ethylene bis-stearamide alone or in combination with other polyethylene and/or polypropylene polymers at 2.0-5.0 wt. % of the commercial product formulation.

5. A cryogenically ground polyalphaolefin polymer at 15-28 wt. % of product comprising unsaturated linear and cyclic ketones propylene carbonate and a bulking agent.

6. The cryogenically-ground polyalphaolefin polymer of claim 5, wherein the bulking agent comprises ethylene bis-stearamide, polyethylene and polypropylene polymers at 1.0-10.0 wt. % of the commercial product formulation.

7. The cryogenically-ground polyalphaolefin polymer of claim 5, wherein the unsaturated linear and cyclic ketones comprise "C-11" [2,6,8 trimethyl-nonan-4-one] at 20-60 wt. % of the commercial product formulation.

8. The cryogenically-ground polyalphaolefin polymer of claim 5, wherein the propylene carbonate comprises 1.0-15.0 wt. % of the commercial product formulation.

9. A cryogenically ground polyalphaolefin polymer at 15-25 wt % of product comprising a bulking agent, an unsaturated linear and cyclic ketone, propylene carbonate, and refined or unrefined vegetable oil.

10. The cryogenically ground polyalphaolefin polymer of claim 9, wherein the bulking agent comprise ethylene bis-stearamide, polyethylene and polypropylene polymers at 1.0-10.0 wt. % of the commercial product formulation.

11. The cryogenically ground polyalphaolefin polymer of claim 9, wherein the unsaturated linear and cyclic ketones comprise "C-11" [2,6,8 trimethyl-nonan-4-one] at 20-60 wt. % of the commercial product formulation.

12. The cryogenically ground polyalphaolefin polymer of claim 9, wherein the propylene carbonate comprises propylene carbonate at 1.0-15.0 wt. % of the commercial product formulation.

13. The cryogenically ground polyalphaolefin polymer of claim 9, wherein the refined or unrefined vegetable oils comprises soy, linseed, cottonseed, rapeseed, and corn oils at 1-20 wt. % of the commercial product formulation.

14. The cryogenically-ground polyalphaolefin polymer of claim 1, wherein the diisobutyl ketone and propylene carbonate comprise a density substantially equal to that of the cryogenically-ground polyalphaolefin polymer to prevent separation of the commercial product formulation.

15. The cryogenically-ground polyalphaolefin polymer of claim 5, wherein the propylene carbonate and unsaturated linear and cyclic ketones comprise a density substantially equal to that of the cryogenically-ground polyalphaolefin polymer to prevent separation of the commercial product formulation.

16. The cryogenically-ground polyalphaolefin polymer of claim 9, wherein the propylene carbonate, the refined or unrefined vegetable oil, and the unsaturated linear and cyclic ketone comprise a density substantially equal to that of the cryogenically-ground polyalphaolefin polymer to prevent separation of the commercial product formulation.

17. The cryogenically-ground polyalphaolefin polymer of claim 1, wherein the cryogenically-ground polyalphaolefin polymer is suspended in the diisobutyl ketone and the propylene carbonate, at least partially dissolved in the diisobutyl ketone and the propylene carbonate, or combinations thereof.

18. The cryogenically-ground polyalphaolefin polymer of claim 5, wherein the cryogenically-ground polyalphaolefin polymer is suspended in the unsaturated linear and cyclic ketones and the propylene carbonate, at least partially dissolved in the unsaturated linear and cyclic ketones and the propylene carbonate, or combinations thereof.

19. The cryogenically-ground polyalphaolefin polymer of claim 9, wherein the cryogenically-ground polyalphaolefin polymer is suspended in the unsaturated linear and cyclic ketone, the propylene carbonate, and the refined or unrefined vegetable oil, at least partially dissolved in the unsaturated linear and cyclic ketone, the propylene carbonate, an the refined or unrefined vegetable oil, or combinations thereof.

20. The cryogenically-ground polyalphaolefin polymer of claim 1, wherein the propylene carbonate comprises liquid propylene carbonate.

* * * * *